(No Model.)

H. RAYMOND.
CAR COUPLING.

No. 530,055. Patented Nov. 27, 1894.

Witnesses

Inventor
Henry Raymond
per Hallock and Hallock
Attorneys

UNITED STATES PATENT OFFICE.

HENRY RAYMOND, OF KNOXVILLE, TENNESSEE.

CAR-COUPLING.

SPECIFICATION forming part of Letters Patent No. 530,055, dated November 27, 1894.

Application filed March 3, 1894. Serial No. 502,242. (No model.)

*To all whom it may concern:*

Be it known that I, HENRY RAYMOND, a citizen of the United States, residing at Knoxville, in the county of Knox and State of Tennessee, have invented certain new and useful Improvements in Car-Couplers; and I do hereby declare the following to be a full, clear, and exact description of the invention, such as will enable others skilled in the art to which it appertains to make and use the same.

My invention relates to that class of car couplers that have two jaws held together by pawls which slip out of the way when the jaws are brought together and return to their normal position, that is, in the path of each other, to lock the jaws when the bringing together of the jaws is completed and remain in that position until withdrawn by mechanism connected with the pawl for that purpose. The withdrawing mechanism as heretofore made was more or less subject to all the movements of the pawls.

The object of this invention is to simplify the construction of such devices by making the pawls and the operating mechanism independent of each other except to withdraw the pawls from engagement with each other.

To that end the invention consists of constructions and combinations all as will be hereinafter described in the specification and pointed out in the claims reference being had to the accompanying drawings, in which—

Figure 1:
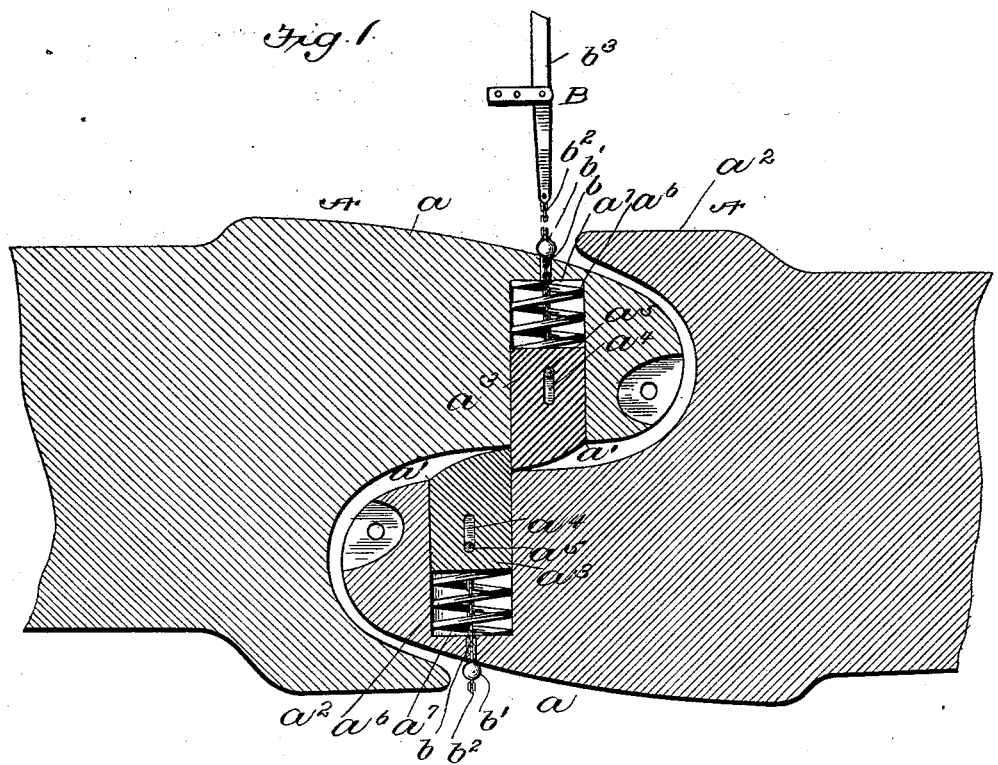
Figure 2:
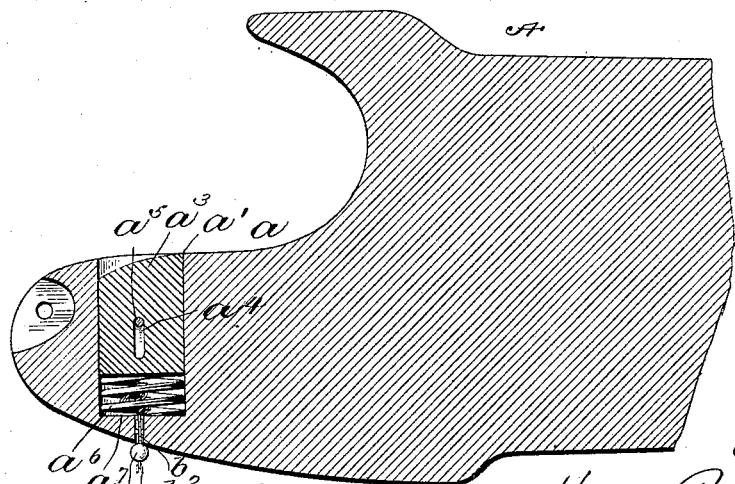

Figure 1, represents a horizontal section of a pair of couplings joined together; and Fig. 2, a similar section of one of the jaws showing the position of the pawl and other parts when the pawls are passing each other at their greatest width.

A represents the jaws which are made in any desired shape and have the long lip $a$ and short lip $a^2$ which respectively overlap the short lip $a^2$ and long lip $a$ of its mate or counter jaw. Each jaw is provided with a recess $a'$ for a pawl $a^3$ which fits snugly in the recess so far as its sides are concerned. The pawl normally projects beyond the mouth of the recess $a'$ to engage with the pawl on the other jaw when the jaws are interlocked. The pawl is provided with an opening $a^4$ through which a pin $a^5$ is passed that limits the movement of the pawl as said pin $a^5$ is secured to the body of the jaw in any desired way. Between the pawl and the inner end of the recess is placed a coiled spring $a^6$ which is compressed when the pawl is forced into the recess and forces the pawl out of the recess to its normal position when the force that compressed the spring has been removed. The hollow spring when compressed leaves practically the same area and the pawl when forced into the recess leaves a space between it and the rear end of the recess as its inward movement is regulated by said pin $a^5$ and opening $a^4$. The space $a^7$ left between the spring, the inner end of the pawl, and the inner end of the recess is utilized to receive the chain $b$ that connects the pawl with the operating mechanism B. The chain $b$ is provided with a button $b'$ that serves as a sort of check when the pawl is forced out by the spring. When the pawl is forced in, the chain coils itself in the space $a^7$ and does not operate upon the pawl operating mechanism B and cause the chain $b^2$ to sag and interfere with the jaw's movements, when the operating lever $b^3$ is not in use as is the case when the two pawls pass each other in bringing the jaws together. In other words the slack of the chain is concealed in the jaw and there is little or no danger of the part outside being caught in anything, as it may be placed upon the platform in such a position that in connection with the lever it will always be taut.

What I claim as new is—

1. In a car coupler of the kind described, the combination of a jaw having a recess, a pawl projecting from said recess and having a slot, a pin passing through said slot to limit the in and out movement of the pawl, a coiled spring in said recess between the inner end of the pawl and the inner end of the recess, a chain connected with said pawl and passing through the space between the pawl and inner end of the recess and having a button to limit its inward movement and mechanism for drawing the pawl into the recess by withdrawing the chain from the recess and not operated by the pawl when the said pawl is moved by the pawl upon the other jaw.

2. In a car coupler of the kind described, the combination of a jaw having a recess, a pawl projecting from said recess and having a slot, a pin passing through said slot to limit the in and out movement of the pawl, a coiled spring in said recess between the inner end of the pawl and the inner end of the recess, a chain connected with said pawl and passing through the space between the inner end of the pawl and the inner end of the recess in which it is coiled when the pawl to which it is attached is moved into said recess and having a button to limit its inward movement, and a lever secured to the car body and having a taut chain connecting it with the button end of the chain in the recess.

In testimony whereof I affix my signature in presence of two witnesses.

HENRY RAYMOND.

Witnesses:
LEWIS BERWANGER,
JAS. H. WELCKER.